Patented July 6, 1943

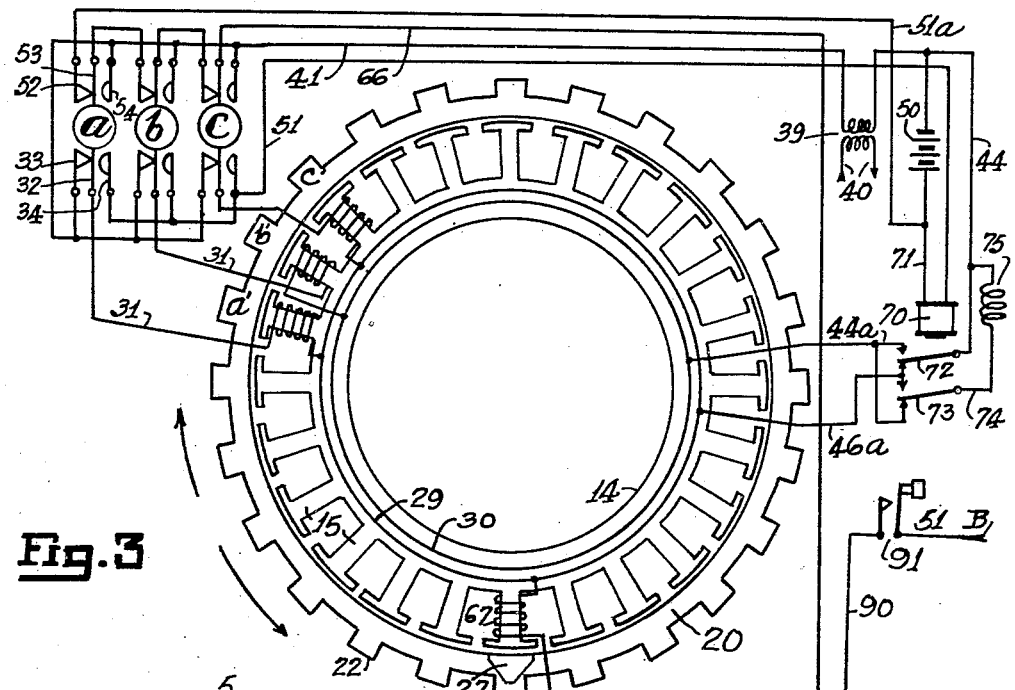
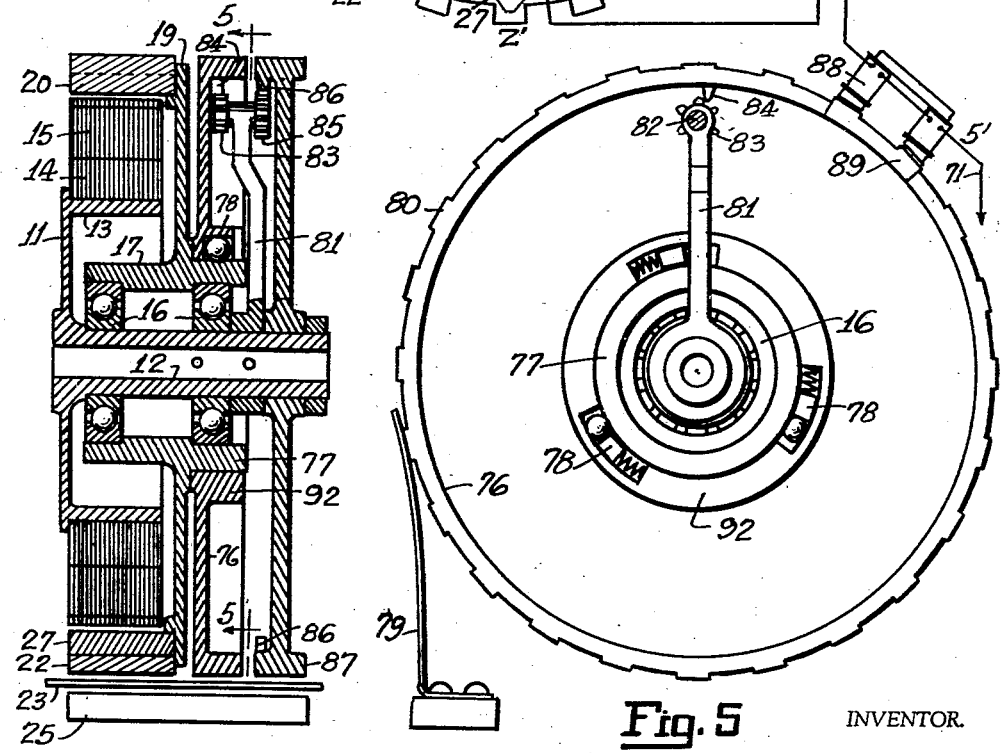
Fig. 3
Fig. 4
Fig. 5
INVENTOR.
Matthew H. Loughridge

2,323,822

UNITED STATES PATENT OFFICE 2,323,822

SELECTIVE SYSTEM AND APPARATUS

Matthew H. Loughridge, Bogota, N. J.; William R. Lockridge, administrator of said Matthew H. Loughridge, deceased Application July 4, 1939, Serial No. 282,833

23 Claims. (Cl. 172—239)

This invention relates to selective apparatus operated by electro-magnetic induction and is of general use.

An object of the invention is to provide apparatus, electrically controlled, that is selectively operated to any previously determined position; another object of the invention is to provide an apparatus that is continuously operated and that may be stopped at any predetermined position by electric controls; another object of the invention is to provide an apparatus having a stator energized by alternating current and having a non-magnetic rotor which is driven by a stator and is stopped in any predetermined position; another object of the invention is to provide a stator supplied with a rotating magnetic field and a non-magnetic rotor driven by this field with means in the non-magnetic rotor, cooperating with the stator, for stopping its movement at any predetermined position; another object of the invention is to provide a stator energized by current of one characteristic and inductively operating a rotor, with means for changing the characteristic of the current at predetermined points in the stator to influence the movement of the rotor, and another object of the invention is to provide a stator energized by alternating current with a non-magnetic rotor, operated by the stator, with means for normally stopping the rotor at a predetermined starting position.

Another object of the invention is to provide a stator energized by alternating current, having a non-magnetic rotor driven by the stator with means for selectively controlling the direction of rotation of the rotor and for stopping the rotor at predetermined positions. Another object of the invention is to provide a stator for operating a non-magnetic rotor to predetermined positions and an accumulator operated by the rotor; and another object of the invention is to provide electro-magnetic means for restoring the accumulator to the starting position.

Another object of the invention is to provide a stator having a plurality of poles which are energized by alternating current to produce a magnetic field and a non-magnetic rotor, operated by the stator, having a magnetic bar therein registering with the poles of the stator as it rotates, with means for changing the energy of any pole of the stator from alternating to direct current to arrest the movement of the stator when the magnetic bar registers with this pole.

Another object of the invention is to control selectively the relative movements of a pair of devices by the use of currents of different characteristics remotely controlled from a keyboard.

The invention further resides in certain detailed applications in the electric circuits whereby the control between the stator and the rotor is varied, as set out more particularly in the specifications.

In the drawings, the application of the invention has been developed in connection with machines of the cash register type in which the amounts are individually recorded and are then followed by a total; this total may be carried into an accumulator for a period of operation, and in this operation deductions or subtractions may be made from the total and, finally, the apparatus is restored to the zero or starting position. These operations are obtained mainly without the use of a mechanical mechanism, the operation being secured by the selective control through the use of electric currents having different characteristics, such as alternating current and uni-directional current.

The invention will be more particularly understood from the following specification describing the operation in detail, and from the accompanying drawings, in which:

Fig. 3 is an electrical diagram of the stator and rotor with a portion of the keyboard arranged to operate the rotor in either direction;

Fig. 4 is a vertical elevation of the stator and rotor operating accumulator discs in one direction; and Fig. 5 is an elevation on line 5—5 of Fig. 4, showing one of the accumulator discs operated by an overrunning ball clutch;

General

Figures 1, 2:
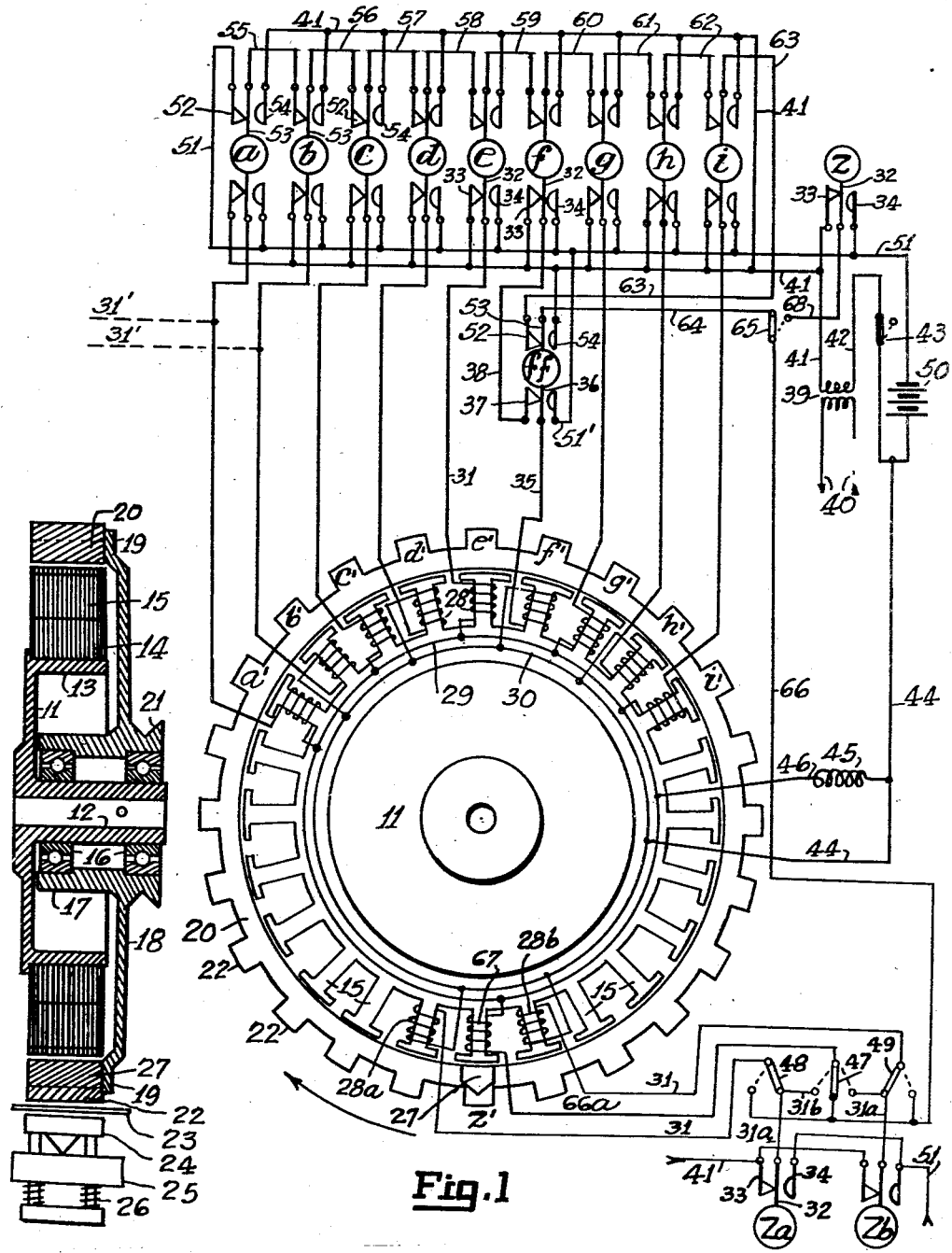
Fig. 1 is a diagram showing the control circuits operated from a keyboard for controlling the stator to move the rotor to a predetermined position.
Fig. 2 is a sectional elevation of the stator and rotor shown in Fig. 1, without the electrical connections.

This invention includes a mechanism comprising a stator which may be constructed in the form used in alternating current motors in which a plurality of poles are provided around the periphery of the stator and are wound with coils producing a field corresponding to the field of a split phase motor. One way of securing this result is to wind one coil to produce an N-pole and the adjacent coil to produce a S-pole, there being inductance in the circuit of one set of coils so as to displace the phase relation of the current in these coils from the circuit in the other set of coils, thereby producing a rotating magnetic field.

A non-magnetic rotor is mounted to rotate in the field of the stator, preferably on ball bearings. This rotor is made of aluminum and is relatively light and therefore easy to start and easy to stop. The rotating magnetic field of the stator normally rotates the non-magnetic rotor due to the eddy currents generated therein and this rotation continues from any starting point until it is arrested by the application of direct current. The operation corresponds to the rotating disc of a watt meter.

The non-magnetic rotor is provided with a magnetic iron bar which aligns with each pole of the stator as the device rotates. This bar is provided opposite one pole only of the stator and it tends to rotate with the rotor by the magnetic field of the stator; however, this influence is rather feeble and is not sufficient to operate the rotor apart from the eddy currents generated therein. This magnetic bar is placed transverse of the rotor and tends to interrupt the eddy currents generated at this point, but this does not retard the operation of the rotor by the remaining portion of the magnetic field produced by the stator.

In order to create a powerful attraction between a non-magnetic rotor and the stator the circuits provide for selecting any particular coil of the stator by the operation of a particular key on the keyboard and this operation takes the selected coil of the stator out of the alternating current circuit and places it in a direct current circuit or in a circuit having uni-directional current, so that the pole energized by this current becomes powerfully magnetized with a fixed polarity. The movement of the non-inductive rotor past a pole that is energized by direct current produces only a slight retarding effect on the rotor which does not materially effect its normal rotation in response to the rotating magnetic field. When, however, the magnetic bar of the rotor registers with this permanently magnetized pole, the mutual magnetic attraction set up immediately acts to stop the rotation of the rotor and to maintain it stationary in this position against the tendency of the stator to produce roation in the rotor. When the direct current circuit of the coil is interrupted the stator immediately carries the rotor forward and continues its rotation until it is again stopped by another permanently energized magnetic pole of the stator.

If the rotor in each operation is required to start from zero as in some forms of tabulating machines, then a coil of the stator energized by direct current is provided at the reference point which may correspond to zero and when the rotor brings the magnetic bar opposite this pole it is stopped in the zero position until it is again operated by another key which interrupts the direct current circuit of the stator coil at the zero position and sets up a coil energized by direct current at the position selected by the particular key.

When it is desired to operate the rotor by the stator in both directions the circuits provide for changing the phase-splitting means from one set of coils to the other to cause the rotation of the magnetic field in the rotor to change direction which thereby moves the rotor in a predetermined direction. The method of winding a phase-splitting motor is well understood in the electrical arts and is not part of the present invention. In this application a relay is operated by the keys so that when the relay is energized to move the rotor to a corresponding position, the rotor is restored to the zero position by deenergizing this relay which changes the phase of the current in the stator coils and moves the rotor backwards to the starting position.

In this application the rotor may be arranged by means of an over-running ball clutch to operate an indicating disc accumulatively so that the amount, or condition, registered by each key is added to the previous amounts until a final total is reached. This is obtained by operating the rotor in each case from zero to the position corresponding with the key and each operation, through the ball clutch, carries forward the indicating disc, a distance corresponding with the movement of the rotor from zero to the selected position. When the rotor turns back to the zero position, the ball clutch releases and the indicating disc remains in the position to which it was moved until it is again moved forward by another operation. To increase the capacity of the indicating mechanism a second disc may be operated by each revolution of the first disc, in the same manner as following discs are operated, by the familiar counting mechanisms.

The indicating discs may be cleared or restored to the zero position by electro-magnetic means in which the disc is made of non magnetic material except for a portion which registers with the poles of a fixed electro magnet. When it is desired to restore the disc to the zero position the circuit of this magnet is energized by direct current and the rotor is rotated by the stator until the indicating disc brings the iron portion into register with the poles of the fixed magnet in which position the rotating apparatus is stopped. This position corresponds with the zero position of the disc.

*The stator and rotor*

In the drawings, 11 is the flange of the stator which is provided with an inner hub 12, keyed to a supporting shaft and is provided with the rim 13 upon which the laminations 14 of the stator are mounted. These laminations are provided with poles 15 and each pole is wound with a coil referred to in connection with the operating circuits.

Upon the hub 12, through the ball bearings 16 the outer hub 17 of the flange 18 is mounted and this flange at 19 connects with, and supports, the rotor 20 which is free to rotate on the ball bearings about the stator 14. The flange 18 may be provided with a belt wheel 21 or with other suitable means for applying the motion of the rotor to some external useful purpose. The rotor 20 is shown provided with pads 22 upon which characters or other data to be registered is placed. Below these pads a record sheet 23 is placed and below this the platen 24, mounted on stand 25 and controlled by springs 26 is placed and so arranged that as platen 24 is raised the marks on the pad immediately above the platen are recorded on 23. It should be understood that this is merely a typical registering arrangement for recording the position of the rotor.

The rotor 20 is made from light non-magnetic material, preferably aluminum, and is provided at 27 with a transverse magnetic bar which registers with each magnetic pole of the stator as the rotor moves around the stator. This bar produces little or no material effect on the rotation of the rotor as it is driven by the stator when the stator is energized by alternating current, but when any pole of the stator is energized by direct current, the magnetic bar 27 is attracted to that pole and the movement of the rotor is thereby stopped.

Keyboard and operating circuits

The stator is provided with energizing coils, each of which is controlled by a key of the keyboard which changes the energy in the coils from alternating to direct current. The poles 15 of the stator are each provided with an energizing coil indicated at 28 and in the return circuit these coils are alternately connected to the annular conductors 29 and 30 and are arranged to produce a rotating magnetic field in the stator after the manner of a split phase motor. Coil 28 is controlled by conductor 31, connecting to member 32 of the controlling key and through contact 33 connects to conductor 41 which is the energy side of the transformer 39, supplied from the mains 40. The return circuit from transformer 39 continues on conductor 42 through switch 43 and conductor 44 to the annular conductor 30 of the stator; another circuit is continued from conductor 44, through inductance 45 and conductor 46 to the annular conductor 29 of the stator.

The keys on the keyboard are indicated by $a$, $b$, $c$, $d$, $e$, $f$, $g$, $h$, and $i$. When a key is pressed the circuit between 32 and 33, which is normally closed, is opened and the circuit between 32 and 34, which is normally open, is closed; also, the circuit between 53 and 52, which is normally closed is opened and the circuit between 53 and 54, which is normally open, is closed. Under normal conditions, the circuit between 32 and 33 at each key is closed and the corresponding coil 28, connecting to each key, is energized by alternating current so that the stator normally is in condition to drive the rotor. It will be noted that the inductance 45 is in series with alternate coils of the stator and operates to displace the phase between the current in these coils and in the adjacent coils, and thus produces the rotating field to drive the rotor.

When a key is pressed, as, for instance, a key $e$, the conductor 31 is disconnected from the alternating current at 33 and at 34 connects to the direct current conductor 51 from battery 50 and from which the return is continued by conductor 44 to the annular conductors 29 and 30 of the stator. The pole of the stator controlled by key $e$ is now energized by uni-directional current from the battery 50 and has one pole pointing outwards and the opposite pole pointing inwards. If the rotor 20 is now rotating under the influence of the alternating current field in the stator, the magnetic bar 27 will be brought into register with this pole which is permanently energized by direct current and will be powerfully attracted thereby so as to stop and hold the rotor at this position until the direct current circuit is interrupted, which occurs when the key is restored to its normal position.

The diagram in Fig. 1 shows part of the wiring of the stator having coils opposite the letters on the rotor $a'$, $b'$, $c'$, $d'$, $e'$, $f'$, $g'$, $h'$, and $i'$, which coils are each connected to the corresponding keys $a$ to $i$, inclusive as above described. When a key of the keyboard is pressed, the particular coil of the stator connected to that key is changed from the alternating current to the direct current circuit and the rotor is stopped with the magnetic bar 27 opposite that particular coil and in position to register a mark corresponding with the key that has been operated. In this way it will be noted that the rotor can be stopped with its reference point, or bar, 27 in register with any selected pole, which pole corresponds with the data to be registered by that particular key.

In some cases it may be desirable to operate the rotor to the same position by either of a pair of independent keys as, for instance, when the keys are used to set up the price of an article and two articles have the same price. This operation is obtained by connecting the alternating current control in series between the keys and the direct current control in multiple. This is shown by the conductor 35 connecting to member 36 of key $ff$ and through contact 37 and conductor 38 to member 32 and member 33 of key $f$ to the alternating current energy wire 41. The member 36, when key $ff$ is depressed, connects to conductor 51' in multiple circuit with the contact member 34 of key $f$ leading to the energy wire 51 from the battery 50. It will be noted that when key $ff$ is depressed the alternating current for the coil opposite $f'$ is cut off and the direct current is supplied in its place. The same operation also obtains when key $f$ is depressed.

The operation described provides for continuously rotating the rotor until a key is depressed and then stopping the rotor until this key is released, when the continuous rotation is resumed. When it is desired to stop the rotor in a predetermined position after each operation so that it will always start from this position and move to the selected position by the operation of each key, a pole of the rotor is continuously energized by direct current so as to stop the rotor with the magnetic bar 27 in register with this pole, except when a key is operated. The pole at the bottom of the rotor is arranged in this way and may be regarded as the reference point of the stator which corresponds to zero in certain tabulating machines. The coil 67 on this pole connects by wire 66a with the switch 47 and by wire 66 to switch 65 and conductor 64 to the contact member 53 and contact member 52 of the switch $ff$ and by conductor 63 and in series by the jumpers 55 to 62 inclusive and by conductor 51 to the battery 50. It will be seen that when any key is depressed the direct current circuit of coil 67 is interrupted and at the same time, the circuit is established between 53 and 54 at each key, which connects the alternating current circuit on conductor 41 to coil 67. This releases the direct current holding circuit on the rotor which is then free to move to the selected position.

If this holding condition is not required, switch 65 is reversed to connect conductor 66 to conductor 68 which places coil 67 under the control of key $z$ and which operates to control the rotor selectively the same as the other keys.

In some cases it may be desirable to change the reference point of the stator as for instance, when operating a coding wheel. For this purpose the coil 28a, adjoining coil 67 to the left may be substituted for 67, or coil 28b, adjoining coil 67 to the right may be substituted for 67. For this purpose the conductor 31 from coil 28b connects to switch 49 and the conductor 31 from coil 28a connects to switch 48. When the switches 47, 48 and 49 are in the positions shown and key $za$ is pressed, coil 28a is energized to stop the rotor and when key $zb$ is pressed, coil 28b is energized to stop the rotor. When these keys are in the normal position the coils 28a and 28b are energized by alternating current. When switch 48 is moved to the left and switch 47 is moved to the left, coils 28a and 67 have changed their function, coil 67 through conductor 31a and 31b is controlled by key 2a and coil 28a is controlled by conductor 66. When switch 47 is moved to the right and switch 49 is moved to the right coil 28b and 67 have changed their function, 67 is now controlled by key 2b through conductor 31a and coil 28 is controlled by conductor 66.

The rotor in Fig. 1, when made of a light material like aluminum and supplied with the iron bar 27 is thereby made heavy-sided, or unbalanced, with a tendency for the bar 27 to move the rotor to the lower position as shown in this figure and this gravity return of the rotor may, in some cases, be used by opening switch 43 and deenergizing the stator, however, for many purposes the rotor should be balanced and the corresponding weight should be added to the rotor to balance the bar 27.

When the rotor is provided with projecting pads as indicated at 22, these pads tend to create an air circulation as the rotor is driven and thereby air cools this structure which is subject to the induced currents from the stator; the pads also tend to dampen or retard the movement of the rotor when it is being stopped.

It should be noted that the electric control set up by the keyboard can be used to operate a number of inductive selectors, each connected in multiple circuit, as indicated by the connections 31' in Fig. 1. In this way repeating indicators my be operated, or indicators having different values for the same key.

This device enables the rotor, which is driven by induced currents, to be stopped in register with each pole of the stator by pressing the key connected with this pole and in which magnetic attraction between the stator and rotor is established instead of the current induced by the alternating current energizing the stator. When the rotor is used for recording the selected subject, it is preferably latched, mechanically, in the recording position.

*Operating an accumulator*

When it is desired to accumulate, or add, the quantity represented by one key to a previous total, a recording disc is provided and mounted on the rotor by a ball clutch so that as the rotor moves from the zero position to a selected position by the operation of a key, the recording disc is moved forward a corresponding distance. Instead, however, of continuing the rotation of the disc in the normal direction after the key is released, it is rotated backwards to the starting position and in this movement the ball clutch is automatically released and the recording disc remains in the position to which it was moved by the normal movement of the rotor. When another key is pressed, the rotor is again moved forward from the zero position to correspond with the selected position of this key and the recording disc is also moved forward a corresponding distance which is added to the previous record, or the amounts represented by each key are totalized by the recording discs. If necessary, a second disc may be mechanically connected with the first disc so that one revolution of the first disc will move the second disc a unit space. For this purpose a relay is operated by the keys so that it is energized when the key is pressed and is deenergized when the key is released. When the relay is energized it adjusts the phase relation of the stator windings to move the rotor in the forward direction, and when it is deenergized it reverses this condition and moves the rotor backwards.

In the diagram in Fig. 3 the relay 70 connects by wire 71 with the battery 50 in series with the direct current supply wire 51 to the operating keys so that each time a direct current circuit is established in one of the coils of the stator relay 70 is energized at the same time. This raises contact finger 72 and connects conductor 44 to conductor 46a and to the annular conductor 30, connected to one set of the stator coils; also, through contact finger 73 a circuit is established from wire 44, through inductance 75, contact 73 and wire 46a to the annular conductor 29 connected to the other set of stator coils. Wire 51a connects battery 50 to contact 52 and contact 53 for controlling the stop coil 67 as in Fig. 1; this circuit does not include the relay 70.

When relay 70 is deenergized, which is the normal condition, the contacts 72 and 73 are in the position shown in Fig. 3, in which conductor 44 connects to conductor 46a and conductor 74 connects to conductor 44a. This is a pole-changing arrangement in which the inductance 75 is included in one circuit when the relay is energized and is included in the other circuit when the relay is deenergized. This inductance is used to change the phase relation of the current in the two sets of coils used to energize the stator and thereby determine the direction of rotation of the rotor.

Mounted on the hub 77 of the rotor 20 is the recording disc 76 which has a hub 92 provided with the ball ratchets 78 which are arranged to engage and to move forward the disc 76 with the recording pads 80 as the rotor 20 is rotated in the normal direction. A flat spring 79 may be used to engage the disc 76 and dampen its movement so that it remains in the position to which it has been moved. When a key is operated, relay 70 is energized and the rotor 20 moves the ball ratchet 78 in the engaging direction and thereby moves forward the disc 76, corresponding to the movement of the rotor 20.

When the key is released relay 70 is deenergized and the rotor is turned backwards to the starting position and in this operation the ball clutch 78 is moved in the disengaging direction so that the recording disc 76 is not moved by the backward rotation of the rotor. When another key is pressed, the rotor is again moved from the starting position to the position corresponding with this key and, in this operation, the ball ratchet 78 is again engaged and disc 76 is carried forward at distance corresponding to this movement of the rotor which is thus added to the previous register of the disc in the order of an accumulator.

A second disc 87 may be operated from the first disc 76 by the mechanism mounted on arm 81 which is fixed on the hub 12 and which is provided with a shaft 82 upon which the star wheel 83 is mounted to engage the tooth 84 on disc 76 and the opposite end of shaft 82 is provided with a spur gear 85 which engages the internal gear teeth 86, mounted on disc 87. Each impulse produced by tooth 84 on star wheel 83 moves the gear 85 a distance corresponding to one unit of register on the disc 87. This construction corresponds with the construction used in a common form of counter.

The discs 76 and 87 may be restored mechanically to the starting position as is common practice in mechanisms of this kind, but in the present instance it is preferred to restore the disc 76 magnetically. For this purpose the disc 76, Fig. 5, is made from non-magnetic material and is provided with the magnetic bar 89, registering with the poles of the direct current magnet 88 shown. This magnet is controlled by conductor 90 and push button 91. To restore the disc 76 to the starting position it is necessary to bring the armature bar 89 into register with magnet 88 and hold it there. For this purpose the push button 91 is closed and one or more of the operating keys a, b, c, etc. are operated to cause rotation of the rotor in the forward direction until 76 is moved to bring 89 into register with 88 in which position the magnetism of 88 stops further movement of 76.

The magnetic bar 27 registers with the pole of the stator when the pole is conditioned by direct current. The position of register depends upon the design of the magnetic circuit established between the stator pole and the magnetic bar. For instance; if the bar is made of soft iron, that is, non-polarized, and one pole of the stator is energized with direct current, there will be a tendency, especially where the poles of the stator are fairly close to each other, to establish a complementary pole in the adjacent pole of the stator. This will stop the rotor with the magnetic bar bridging the gap between the adjacent poles.

If it is desired to locate the registering position on the centre line of the poles of the stator, this may be secured by using a polarized magnetic bar in the rotor having its poles aligning with the axis of the stator poles and so arranged that opposite polarities of the stator and bar are adjacent. The magnetic bar passes over the poles of the stator when they are deenergized or are energized by alternating current with relatively little effect upon the movement of the stator as this magnet acting alone cannot overcome the influence of the rotating magnetic field. When the magnetic bar and the stator pole act together the reference point of the rotor is located opposite the pole. If two poles of the stator are energized at the same time to produce complementary N and S poles a non-polarized magnetic bar will register in a position between these poles.

The various forms of the invention may each be applied alone in the mechanical arts or they may be grouped and applied to varying degrees in a single piece of apparatus if all the conditions are necessary to secure the results. The apparatus has been shown applied to light running mechanisms but where heavier running mechanisms are used the induced currents in the non-magnetic rotor may be increased by the use of copper conductors in this rotor and the momentum of the rotor which has to be overcome when the stopping force is applied, must be provided for in the design of the apparatus.

The rotor is stopped by a stop action at the predetermined position; it is not stopped by a brake action that has no reference point; it is not stopped by the cessation of a stepping action that drives it, instead, the stop action is positive, it overcomes the momentum of the rotor and it insures the stop at the point desired even when the rotor is driven by a continuous impulse. The stop is secured through an air gap by a magnetic flux which increases as the magnetic portion of the rotor moves into the field of this flux with a tapering increase until the maximum stopping condition is reached at the point of register. The stop is produced without mechanical friction or mechanical engagement between the rotor and the stator.

The coils of the stator are used for the alternating and for the direct current circuits, but where there is sufficient room on the poles separate coils may be used for each kind of current.

Having thus described my invention, I claim:

1. Selectively operated apparatus comprising a stator having a plurality of energizing coils and a rotor separated from the stator by an air gap, means in the stator co-operating with the rotor to drive the rotor from any position, a plurality of normally inactive stopping means spaced in the stator, a key controlling each of said stopping means to make it active and a single means in said rotor co-operating with the active stopping means to stop the rotor in a position corresponding with the key that has been operated.

2. Selectively operated apparatus comprising a stator having a plurality of energizing coils and a rotor separated from the stator by an air gap, means in the stator co-operating with the rotor to drive the rotor from any position, a plurality of radially spaced and normally inactive stopping means in the stator, a key controlling each of said means to make it active, and a single means in the rotor registering with the stopping means and co-operating with the active stopping means to stop the rotor in a position corresponding with the key that has been operated.

3. Selectively operated apparatus comprising a stator and a non-magnetic member moving relative to said stator and having a magnetic bar, said stator having a plurality of poles with a coil in each pole, means for energizing said coils with alternating current for moving said member by induction and means for selectively energizing a predetermined coil with direct current for acting upon said magnetic bar.

4. Selectively operated apparatus comprising a stator and a non-magnetic moving member relative to said stator and having a magnetic bar, said stator having a plurality of poles with a coil on each pole, means for energizing said coils with alternating current for moving said member by induction and remotely located means for changing the current in any predetermined coil from alternating current to direct current to stop the movement of said member.

5. Selectively operated apparatus comprising a stator and a non-magnetic rotor inductively related to said stator, said stator having a plurality of poles wound with coils to produce a rotating magnetic field when energized by alternating current to drive said rotor, said rotor having a magnetic bar moving over said poles as the rotor is moved, and means for energizing any selected coil to produce a permanent magnetic field to attract said magnetic bar and stop said rotor.

6. Selectively operated apparatus comprising a stator with a plurality of poles each having a coil thereon, a rotor rotating about said stator, said rotor being made of a non-magnetic metal with a magnetic portion therein registering with the poles of the stator, a controlling circuit for each coil, a key in said circuit for connecting said coil to an alternating current supply to drive said rotor, and for connecting said coil to direct current to provide a permanent magnetic field for influencing the magnetic portion to modify the rotation of said rotor.

7. Selectively operated apparatus comprising a stator having a plurality of poles with coils connected to produce a rotating magnetic field by alternating current, a non-magnetic rotor rotating about said stator by said rotating magnetic field, a magnetic bar in said rotor registering with the poles of the stator, means for energizing any of said poles with a permanent polarity for attracting said bar to stop said rotor, and means controlling said rotating magnetic field to drive the rotor in either direction.

8. Selectively operated apparatus comprising a stator having a split phase winding, energized by alternating current, a non-magnetic rotor driven by said stator, a magnetic bar in said rotor, means for energizing a portion of said stator with direct current to attract said bar and stop the rotor, and means for changing the phase relation of the current energizing said stator to reverse the direction of said rotor.

9. In combination, a stator having poles with a winding thereon, a non-magnetic rotor having a bearing in the centre of said stator and rotating in inductive relation to said poles, a magnetic member carried by said rotor in inductive relation to said poles, a keyboard having a key controlling the winding of each pole and operating to energize the pole with either alternating or direct current.

10. In a selective apparatus, the combination, a stator having poles energized by alternating current to produce a rotating field, a non-magnetic rotor for said stator driven by said rotating field, means for energizing one of said poles by direct current, and means in said rotor co-operating with the direct current energized pole only to stop the rotor with its co-operating means in register with the direct current energized pole.

11. In a selective apparatus, the combination, a stator having poles with windings thereon energized by alternating current, said windings producing alternately, N and S polarities and a separate return circuit for the windings producing these polarities, an inductance device in the circuit of one of said sets of windings to produce a rotating field, means for energizing any of said poles with direct current and removing the alternating current therefrom, a non-magnetic rotor rotating about said stator and means in the rotor co-operating with the direct current energized pole to stop the rotor in a predetermined position.

12. In a selective apparatus, the combination, a stator having poles, a winding for each pole, a circuit for each winding, a key controlling each circuit, a source of alternating current, a source of direct current, a non-magnetic rotor rotating about said stator and having a magnetic member to register with each pole at it rotates, said key in one position establishing a circuit from the alternating current source to said winding to drive the rotor and in another position establishing a circuit from the direct current source to said winding to stop the rotor.

13. A selective apparatus comprising a stator having a plurality of poles with a coil on each pole, a non-magnetic rotor rotating about said stator and having a reference portion responsive to said poles only when said poles are energized by direct current, a circuit for each coil, a source of alternating current, a source of direct current, a key controlling each circuit and in the normal position connecting the alternating current to the coils of the stator to drive the rotor and each key, when operated, disconnecting the alternating current and connecting the direct current to the coil it controls to influence the reference point of the rotor.

14. A selective apparatus comprising a stator having a plurality of poles with a coil on each pole, a circuit for each coil, a non-magnetic rotor rotating about said stator and having a reference portion responsive to said poles when said poles are energized by direct current, a source of alternating current, a source of direct current, a key controlling each circuit to energize the coils from the alternating current, a starting coil energized by direct current to influence the reference portion of the rotor and all of the keys controlling the circuit of said starting coil.

15. A selective apparatus comprising a stator having a plurality of poles with a coil on each pole, a circuit for each coil, a source of alternating current, a source of direct current, a non-magnetic rotor rotating about said stator and having a reference portion responsive to said poles when said poles are energized by direct current, a key controlling each circuit to energize said coils with alternating current for driving the rotor, a starting coil energized by said direct current to co-act with said reference portion to stop the rotor at the starting position, and each key, when operated, disconnecting the direct current from said starting coil and connecting it to the coil controlled by said key to enable the rotor to move from the starting position and to stop at the coil controlled by the operated key.

16. A selective apparatus comprising a stator having a plurality of poles with a coil on each pole, a circuit for each coil, a source of alternating current, a source of direct current, a non-magnetic rotor rotating about said stator and having a magnetic portion responsive to said poles when energized by direct current, a key controlling each circuit to energize said coils from said alternating current, a starting coil energized by direct current and controlled by said keys for stopping the rotor and means, independent of said keys for changing the starting coil from one coil to another by controlling the direct current energizing the coil.

17. A selective apparatus comprising a stator having a plurality of poles with a coil on each pole, a non-magnetic rotor rotating about said stator and having an element only responsive to said poles when said poles are energized with a steady magnetic flux, means for creating a rotating field in said stator to drive said rotor, means for creating a steady magnetic flux in one pole of the stator to stop the rotor and means for changing the steady flux to any predetermined pole of the stator to stop the rotor in a selected position.

18. A selective apparatus comprising a stator having a plurality of poles with a coil on each pole, a non-magnetic rotor rotating about said stator and having an element only responsive to said poles when said poles are energized with a steady magnetic flux, means for creating a rotating field in said stator to drive said rotor, means for creating a steady magnetic flux in one pole of the stator to stop the rotor, a key controlling the circuit of each coil, said keys controlling the means producing the rotating field in multiple circuit and controlling the means producing the steady magnetic flux in series.

19. A selective apparatus comprising a stator having a plurality of poles with a coil on each pole, a circuit for each coil, a non-magnetic rotor rotating about said stator and having a magnetic member registering with each pole as it rotates, a source of alternating current, a source of direct current, a common return circuit for alternate coils and a second common return circuit for the other coils, an inductance in one of said return circuits, said source of alternating current and said source of direct current connected to said return circuits, a key controlling each of said circuits and when in one position connecting said alternating current to said coil and when in another position, disconnecting the alternating current and connecting the direct current to said coil.

20. A selective apparatus comprising a stator having a plurality of poles with a coil on each pole, a circuit for each coil, a non-magnetic rotor rotating about said stator and having a magnetic member registering with each pole as it rotates, a source of alternating current, a source of direct current, a common return circuit for alternate coils, a second common return circuit for the other coils, a phase displacing device in one of said return circuits, means controlling said phase displacing device to place it in either of said return circuits, and a key controlling each of said circuits to energize it from said alternating current or from said direct current, said key also controlling said means for controlling the phase displacing device to place it in either of said return circuits.

21. A selective apparatus comprising a stator having a plurality of poles with a coil on each pole, a circuit for each coil, a non-magnetic rotor rotating about said stator and having a magnetic member registering with each pole as it rotates, a source of alternating current, a source of direct current, a common return circuit for alternate coils, a second common return circuit for the other coils, a phase displacing device in one of said return circuits, said source of alternating current and said source of direct current connected to said return circuits, a relay which, when energized places said phase displacing device in one of said return circuits and when in the deenergized position, places said device in the other return circuit and a key controlling the circuit of each coil to energize it from the alternating current or from the direct current and also controlling the circuit of said relay.

22. A selective apparatus comprising a stator having a plurality of poles with a coil on each pole, a non-magnetic rotor rotating about said stator and having a reference element responsive only to said poles when energized by direct current, a circuit for each coil, a source of alternating current, a source of direct current, a key controlling each circuit and connecting it with the alternating current source to drive the rotor, means for applying the alternating current to drive the rotor in either direction and said key disconnecting the alternating current from said circuit and connecting direct current to it to stop the rotor in a position corresponding with the key operated.

23. Selectively operated apparatus comprising a stator having poles energized by alternating current, and a non-magnetic rotor driven by said stator and having a magnetic member registering with said poles, a source of direct current, a keyboard having keys controlling the circuits of said poles for changing the current to each pole from alternating to direct current to stop the rotor in a position corresponding with the key that is operated, and a pair of said keys controlling the alternating current to one of said coils in series and controlling the direct current to the same coil in multiple to stop the rotor in the same position for each key.

MATTHEW H. LOUGHRIDGE.